US 9,560,925 B2

(12) United States Patent
Harris

(10) Patent No.: US 9,560,925 B2
(45) Date of Patent: Feb. 7, 2017

(54) UNIVERSAL EATING UTENSIL HAVING SURVIVAL ACCESSORIES

(71) Applicant: Essential Adaptations, LLC, Raleigh, NC (US)

(72) Inventor: Robert Harris, Raleigh, NC (US)

(73) Assignee: Essential Adaptations, LLC, Raleigh, NC (US)

( * ) Notice: Subject to any disclaimer, the term of this patent is extended or adjusted under 35 U.S.C. 154(b) by 156 days.

(21) Appl. No.: 14/711,728

(22) Filed: May 13, 2015

(65) Prior Publication Data

US 2015/0330781 A1 Nov. 19, 2015

Related U.S. Application Data

(60) Provisional application No. 61/993,294, filed on May 15, 2014.

(51) Int. Cl.
*G01C 17/02* (2006.01)
*A47G 21/04* (2006.01)
*A47G 21/02* (2006.01)
*A47G 21/00* (2006.01)

(52) U.S. Cl.
CPC ............... *A47G 21/04* (2013.01); *A47G 21/02* (2013.01); *G01C 17/02* (2013.01); *A47G 2021/002* (2013.01)

(58) Field of Classification Search
CPC .. A47G 21/04; A47G 2021/002; G01C 17/02; G01C 17/34
USPC .................. 33/270, 271, 334, 355 R; 30/324
See application file for complete search history.

(56) References Cited

U.S. PATENT DOCUMENTS

| 3,865,115 A * | 2/1975 | De Mieri ............... A47G 21/04 606/235 |
| 5,582,554 A * | 12/1996 | Stryczek ................ A63B 57/00 2/160 |
| 6,393,704 B1 * | 5/2002 | Tompkins .............. A47G 21/04 30/324 |
| 2006/0213493 A1* | 9/2006 | Shih ........................ F41B 11/00 124/80 |
| 2009/0205209 A1* | 8/2009 | Tovar ..................... A47G 21/04 30/324 |
| 2015/0075006 A1* | 3/2015 | Edry ..................... A47G 21/004 30/125 |
| 2016/0058221 A1* | 3/2016 | Karpinsky ........... A47G 19/025 206/459.5 |
| 2016/0338364 A1* | 11/2016 | Jeffery ................. A21C 15/007 |

* cited by examiner

*Primary Examiner* — G. Bradley Bennett
(74) *Attorney, Agent, or Firm* — NK Patent Law, PLLC

(57) ABSTRACT

A multi-function tool includes a utensil, a handle pivotally attached to the utensil, and a compass magnet mounted on the handle or utensil. The multi-function tool has a center of gravity, in at least one configuration, aligned with a convex side of the utensil to balance the multi-function tool. A sundial may be mounted on the multi-function tool. Geographical direction is determined by configuring the multi-function into a folded configuration in which the handle and utensil extend in generally the same direction from a hinge, balancing the multi-function tool upon the convex side of the eating utensil thereby permitting the compass magnet to cause a rotational orientation of the multi-function tool; and determining a geographical direction from the rotational orientation of the multi-function tool.

20 Claims, 5 Drawing Sheets

UNIVERSAL EATING UTENSIL HAVING SURVIVAL ACCESSORIES

CROSS-REFERENCE TO RELATED APPLICATION

This application claims the benefit of priority of U.S. provisional patent application No. 61/993,294, titled "UNIVERSAL EATING UTENSIL HAVING SURVIVAL ACCESSORIES," filed on May 15, 2014, which is incorporated herein in its entirety by this reference.

TECHNICAL HELD

This disclosure is directed towards a universal eating utensil having survival accessories, and, more particularly, towards an eating utensil having direction determining capabilities and time determining capabilities.

BACKGROUND

Outdoor adventurists may pack one or more survival items for a given outdoor trip. For example, an adventurist may pack a blade for cutting, a tent for providing shelter, matches or other fire starting items, and the like. Adventurists need to pack as few items as possible in order to reduce weight and volume of the total items being transported.

Certain items may have multiple utilizes in order to reduce weight and volume of items required for a given outdoor adventure. For example, a Swiss army knife is a favorite of outdoor adventurers and is a knife that includes multiple utility items such as blades, files, and eating utensil portions.

Outdoor adventurists are always looking for new manners in which to reduce the items needed for a given adventure.

SUMMARY

This Summary is provided to introduce in a simplified form concepts that are further described in the following detailed descriptions. This Summary is not intended to identity key features or essential features of the claimed subject matter, nor is it in be construed as limiting the scope of the claimed subject matter.

In at least one embodiment, a multi-function tool includes: a utensil having a generally arcuate convex side; a handle pivotally attached to the utensil; and a compass magnet mounted on the handle or utensil, wherein the multi-function tool has a center of gravity, in at least one pivotal configuration of the utensil and handle, aligned with the generally arcuate convex side of the utensil to balance the multi-function tool upon the generally arcuate convex side of the utensil.

In at least one example, the compass magnet is configured to rotate at least one portion of the utensil or handle to magnetic pole north upon balance of the multi-function tool upon the generally arcuate convex side of the utensil.

In at least one example, a hinge pivotally attaches the handle to the utensil, the multi-function tool has an unfolded configuration in which the utensil and handle extend in generally opposite directions from the hinge, and the multi-function tool has a folded configuration in which the utensil and handle extend in generally the same direction from the hinge.

In at least one example, a stabilizing element is attached to the handle at an adjustable position, wherein the center of gravity of the multi-function tool is adjustable by adjustment of the adjustable position of the stabilizing element.

In at least one example, the stabilizing element includes a tongue and the utensil defines a channel that receives the tongue to lock the multi-function tool in the unfolded configuration.

In at least one example, the tongue includes a bulge the snaps into a notch defined in the channel to lock the tongue in the channel.

In at least one example, the handle includes a pair of parallel rails and the stabilizing element defines a pair of channels that receive the rails.

In at least one example, the handle includes at least one bridge that connects the rails.

In at least one example, a sundial is mounted on the stabilizing element.

In at least one example, the sundial includes a gnoman pivotable into a flush position with a face of the sundial.

In at least one example, the utensil includes: abuse; at least one post extending from the base and received in a hole defined by the handle such that the at least one post and hole pivotally attach the handle to the utensil and define the hinge; a spoon portion extending from the base in a first longitudinal direction and defining the generally arcuate convex side of the utensil; and a lever extending from the base in a second longitudinal direction generally opposite the first longitudinal direction, the lever engaging the handle in the unfolded configuration.

In at least one example, the utensil comprises a bar attached to the lever, the bar having at least one dimension two great to pass between two rails of the handle to register the lock multi-function tool in the unfolded configuration with respect to at least one direction of pivoting of the utensil and handle.

In at least one example, a sundial is mounted on the utensil or handle.

In at least one example, the sundial includes a gnoman pivotable into a flush position with a face of the sundial.

According to at least one embodiment, a multi-function tool is used at least to determine geographical direction by a method that includes: configuring a multi-function tool having an eating utensil and a handle pivotally attached to the utensil by a hinge into a folded configuration in which the handle and utensil extend in generally the same direction from the hinge, the multi-function tool having a compass magnet mounted on the handle or utensil; balancing the multi-function tool upon a generally arcuate convex side of the eating utensil thereby permitting the compass magnet to cause a rotational orientation of the multi-function tool; and determining a geographical direction from the rotational orientation of the multi-function tool.

In at least one example, the method includes configuring the multi-function tool into an unfolded configuration in which the eating utensil and handle extend in generally opposite directions from the hinge.

In at least one example, the method includes using the eating utensil to carry food.

In at least one example, balancing the multi-function tool includes adjusting a center of gravity of the multi-function tool over the generally arcuate convex side of the eating utensil by adjusting a position of a stabilizing element attached to the handle.

In at least one example, the method includes configuring the multi-function tool into an unfolded configuration in which the eating utensil and handle extend in generally opposite directions from the hinge; and locking the multi-function tool into the unfolded configuration by moving the position of the stabilizing element.

In at least one example, the method includes determining a time using a sundial mounted on the multi-function tool.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
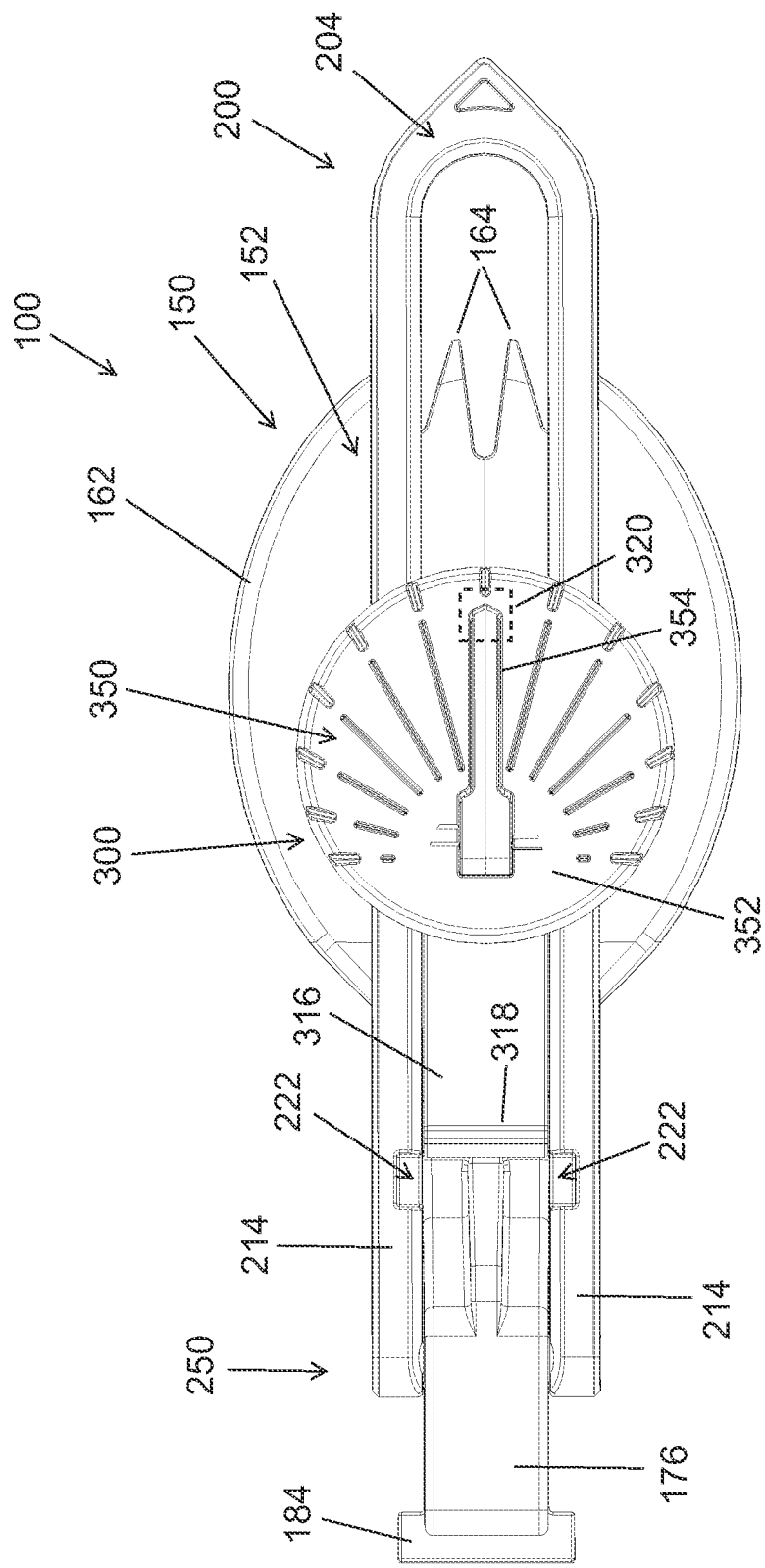
FIG. 1 is a plan view of a multi-function tool shown in a folded configuration, according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Figure 2:
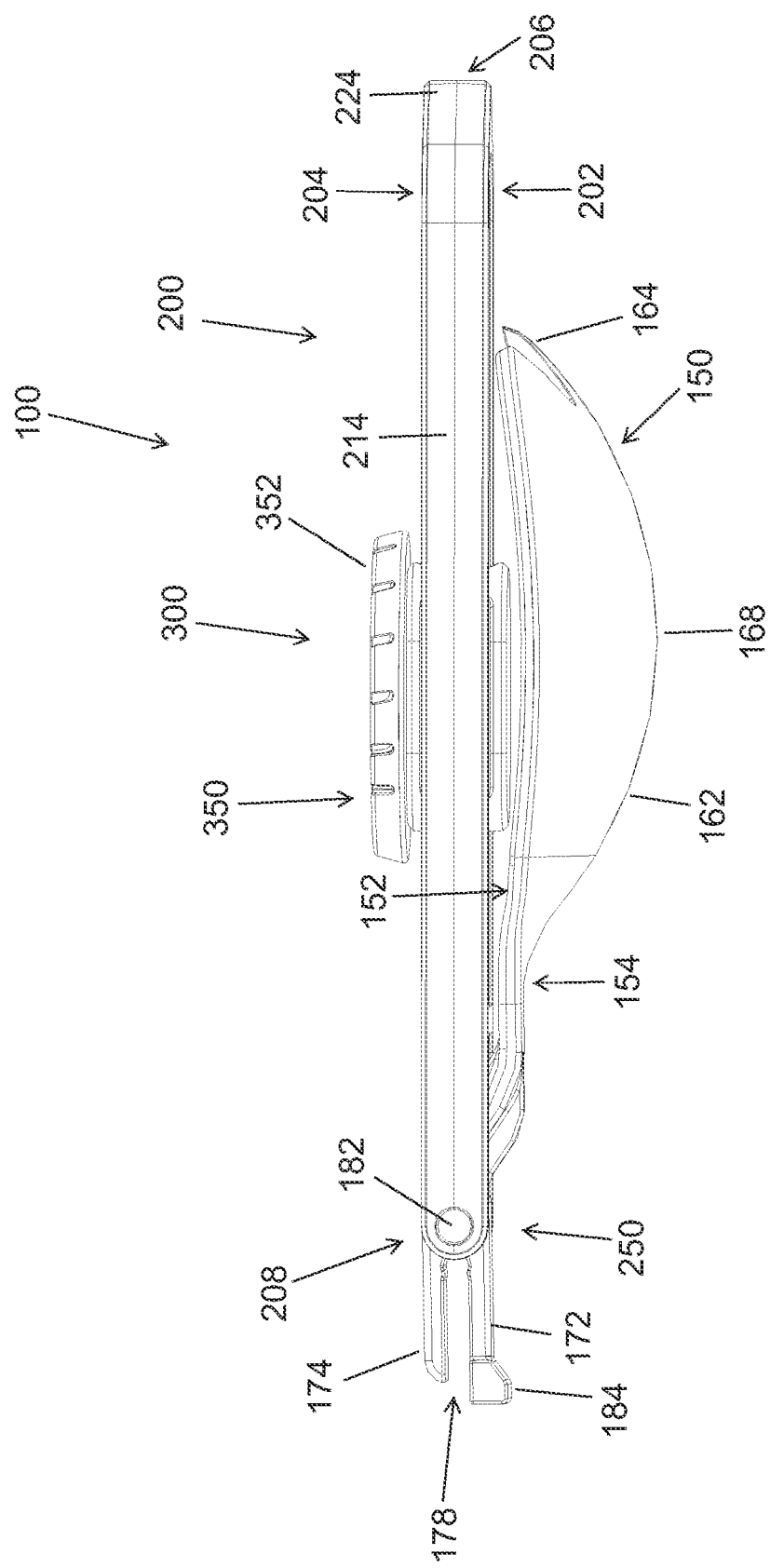
FIG. 2 is a side elevation view of the multi-function tool of FIG. 1, shown in the folded configuration.

FIG. 1 is a plan view of a multi-function tool 100, shown in a folded configuration, according to at least one embodiment. FIG. 2 is aside elevation view of the multi-function tool of FIG. 1, shown in the folded configuration. The multi-function tool 100 includes a multi-function eating utensil 150 pivotally attached to a multi-function handle 200 by a hinge 250. For convenience, these descriptions refer to a palmar first side 102, a dorsal second side 104, a proximal longitudinal first end 106, and a distal longitudinal second end 108 of the multi-function tool 100 with reference now to FIG. 3, which is a dorsal-side perspective view of the multi-function tool 100 of FIG. 1 in an unfolded configuration.

Figure 3:
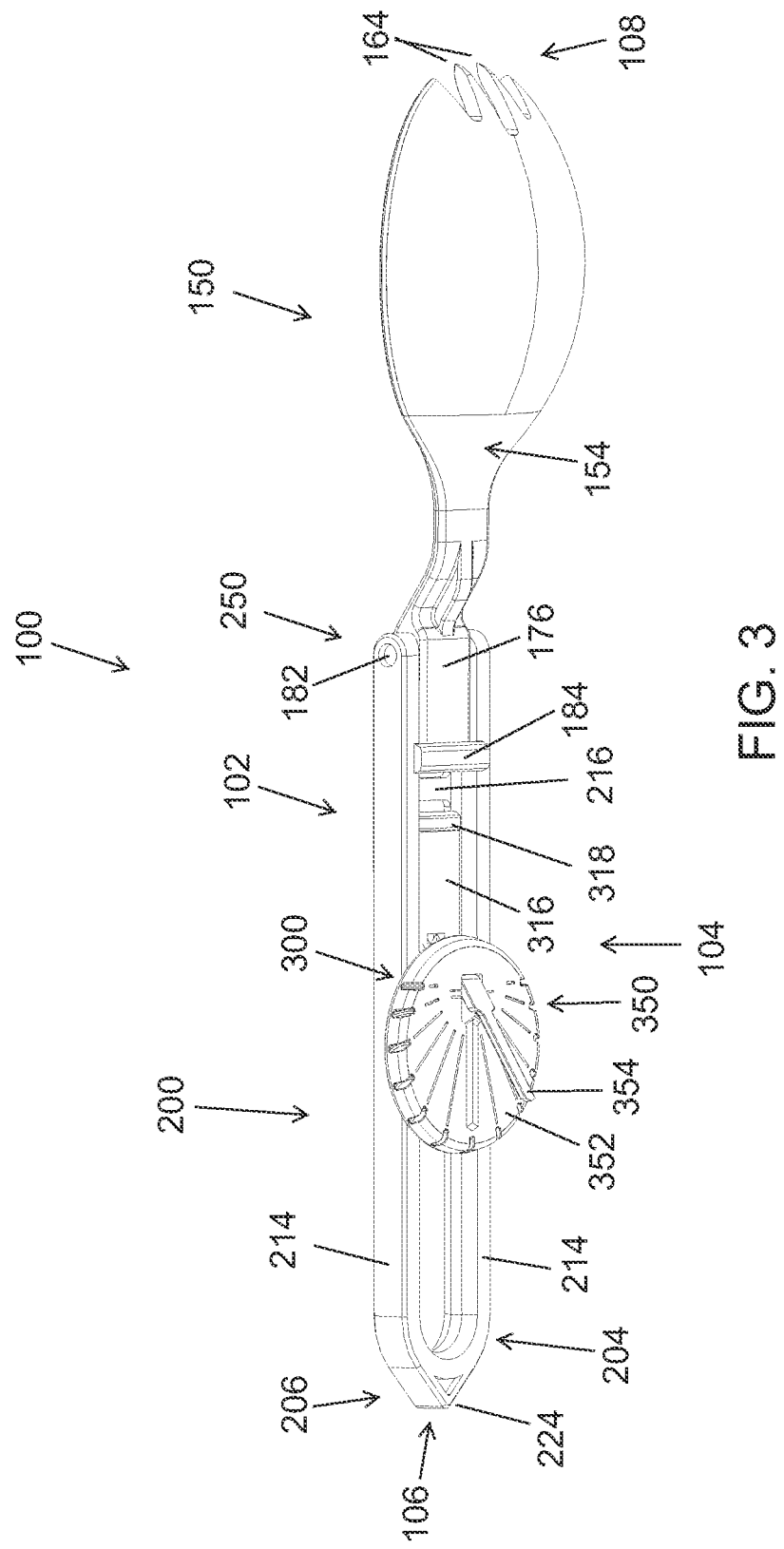
FIG. 3 is a dorsal-side perspective view of the multi-function tool of FIG. 1 in an unfolded configuration.
Figure 4:
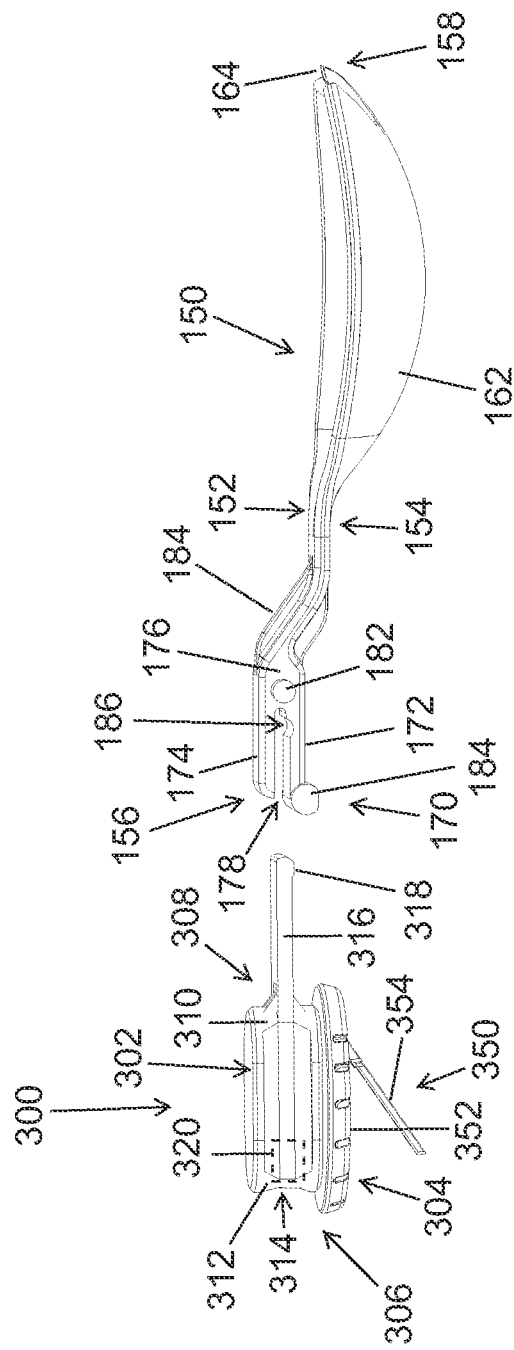
FIG. 4 is a slight palmar-side exploded perspective view of the eating utensil and stabilizing element components of the multi-function tool of FIG. 1.
Figure 5:
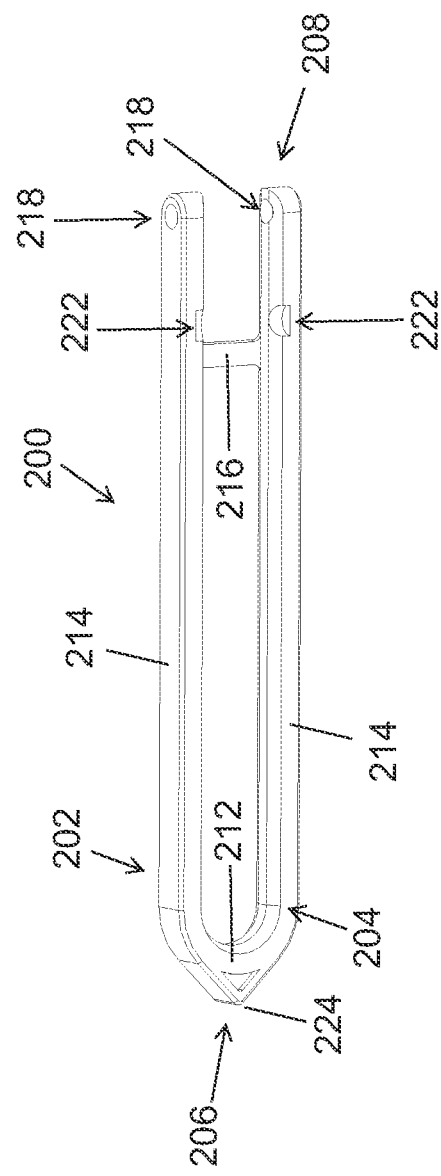
FIG. 5 is a dorsal-side perspective view of the handle component of the multi-function tool of FIG. 1.

An intuitive appreciation of such nominal terms as proximal, distal, palmar and dorsal can be had in particular view of FIG. 3. Generally, when in use in the unfolded configuration for eating, the multi-function tool 100 is likely to be grasped at the generally proximal first end 106, which is defined by the handle 200, for the carrying of food by the generally distal second end 108, which is defined by the eating utensil 150. As such, in any folded (FIGS. 1-2) and unfolded (FIG. 3) configuration of the tool 100, the eating utensil 150 can be described as having a proximal longitudinal first end 156 and a distal longitudinal second end 158 (FIG. 4). By the same convention, in any folded and unfolded configuration of the tool 100, the handle 200 can be described as having a proximal longitudinal first end 206 and a distal longitudinal second end 208 (FIG. 5). By that convention for example, the distal second end 158 of the eating utensil 150 and the proximal first end 206 of the handle 200 extend from the hinge 250 in approximately the same longitudinal direction in the folded configuration of the multi-function tool 100 (FIGS. 1-2), and in approximately opposite longitudinal directions from the hinge in the unfolded configuration (FIG. 3).

The eating utensil 150 is configured in the illustrated embodiment as having both a smoothly arcuate spoon-like scoop or spoon 162 and distal end fork tines 164 in an arrangement that may be described as a spork or foon. The spoon 162 is generally concave along a palmar first side 152 and generally arcuate and convex along an opposite dorsal second side 154 of the eating utensil. The fork tines 164 follow the contour of the spoon 162 to their distal tips 166.

The palmar first side 152 (FIG. 2) of the eating utensil 150 and a palmar first side 202 of the handle 200 face approximately the same direction in the unfolded (FIG. 3) configuration, and face approximately opposite directions in the folded configuration (FIG. 1-2) of the multi-function tool 100. By the same convention, the dorsal second side 154 of the eating utensil 150 and a dorsal second side 204 of the handle 200 face the same direction in the unfolded (FIG. 3) configuration, and face opposite directions in the folded configuration (FIG. 1-2) of the multi-function tool 100.

In the illustrated embodiment, a longitudinally rearward extending proximal lever 170 defines the proximal first end 156 of the eating utensil 150 as best shown in FIG. 4, which is a slight palmar-side exploded perspective view of the eating utensil 150 and a multi-function stabilizing element 300, according to at least one embodiment. The lever 170 includes a palmar side first lever portion 172 and a dorsal side second lever portion 174 that extend longitudinally from a base 176. The base 176 serves as a fulcrum with respect to the lever 170 and hinge 250. A channel 178 is defined between the first lever portion 172 and second lever portion 174 for locking of the hinge 250 to maintain the multi-function tool 100 in the unfolded configuration (FIG. 3) as further described below. Two posts 182 extend from the base 176 in opposite outward lateral directions. An inclined and longitudinally forward extending arm 184 connects the base 176 to the spoon 162. Thus, considered in order from the rearward or proximal first end 156 to the forward or distal second end 158, the eating utensil 150 includes the lever 170 (having both the first lever portion 172 and second lever portion 174), the base 176 (from which the posts 182 extend in opposite lateral directions), the spoon 162, and the tines 164.

FIG. 5 is a dorsal-side perspective view of the handle 200 of the multi-function tool 100 of FIG. 1. Considered in order from the rearward or proximal first end 206 to the forward or distal second end 208, the handle 200 includes a proximal first bridge 212, a parallel pair of laterally spaced longitudinally extending rails 214, and a medial second bridge 216.

The proximal first bridge 212 spans the lateral space between and connects the proximal ends of the rails 214. Similarly, the medial second bridge 212 spans the lateral space between and connects the rails 214 at a longitudinal position between their proximal and distal ends. Thus, the forward or distal end of each rail 214 extends longitudinally forward beyond the medial second bridge 216. The forward or distal end of each rail 214 has a laterally extending hole 218 for receiving a respective one of the posts 182 that extend from the base 176 of the eating utensil 150. The posts 182 turn freely or with slight frictional resistance within the holes 218, serving as hinge pins about which the handle 200 can turn relative to the eating utensil 150 permitting the multi-function tool to be folded (FIGS. 1-2) for compact storage and unfolded (FIG. 3) for some uses, for example for eating.

Thus, in the illustrated embodiment, the posts 182 and holes 218 define the hinge 250. In other embodiments, other arrangements provide hinging movement of the handle 200 and eating utensil 150. In the illustrated arrangement, the eating utensil 150 includes a first locking structure that engages a corresponding first locking structure of the handle 200 to prevent hinging opening movement beyond the unfolded configuration of FIG. 3 when unfolding from the folded configuration toward the unfolded configuration. In particular, the palmar side first lever portion 172 includes a proximal end laterally extending bar 184, having two lateral ends, each extending outward as a post parallel to a same-side hinge post 182. The lateral width of the bar 184 is too great to fit between the rails 214. When assembled (FIGS. 1-3), the base 176 is generally trapped between the forward or distal ends of the rails 214, with the posts able to rotate within the holes 218 in a relative angle range between the folded configuration (defined by proximity or contact of the palmar side 152 of the eating utensil 150 and palmar side 202 of the handle 200) and unfolded configuration (defined by engagement of the bar 184 and the forward or distal ends of the rails 214).

In the illustrated embodiment, a detent 222 (FIG. 4) is formed in each rail 214 along the dorsal side 204 of the handle to register with and engage a corresponding lateral end of the bar 184 upon full unfolding of the multi-function tool 100 (FIG. 3). This advantageously prevents relative dorsal direction hinging movement of the eating utensil 150 relative to the handle 200 beyond full unfolding so that, for example, food can be lifted on the palmar first side of the spoon 162 and distal end fork tines 164 of the eating utensil.

The multi-function tool 100 can be further locked in the unfolded configuration (FIG. 3) by the multi-function stabilizing element 300. The stabilizing element has a sliding block 310 (FIG. 4) having a palmar first side 302, dorsal second side 304, a proximal longitudinal first end 306, a distal longitudinal second end 308, and lateral side 312 (FIG. 4). A longitudinally extending channel 314 formed in each lateral side 312 engages a respective same side handle rail 214 as shown in FIG. 2, trapping the block 310 between the rails 214 in a longitudinal position that is adjustable by longitudinally sliding the stabilizing element 300 along the handle 200. A tongue 316 extends longitudinally forward from the distal end 308 of the block 310 to be received in the channel 178 between the first lever portion 172 and second lever portion 174 that extend rearward from the eating utensil 150. When the eating utensil 150 reaches the unfolded configuration (FIG. 3) relative to the handle 200, the tongue 316 and channel 178 align, and forward movement of the stabilizing element 300 extends the tongue 316 into the channel 178 locking the multi-function tool 100 in the unfolded configuration. A bulge 318 at the forward or distal end of the tongue 316 snaps into a corresponding notch 186 (FIG. 4) formed in the channel 178 to register and lock the stabilizing element 300 in its most forward or distal position locking the multi-function tool 100 in the unfolded configuration.

The multi-function stabilizing element 300 also includes a compass magnet 320. The compass magnet 320 is configured for providing geographical north-pole detecting function to the multi-function tool 100. In the illustrated embodiment, the magnet 430 is attached to or positioned within the stabilizing element 300, and thus with the stabilizing element is mounted on the handle 200. In at least one embodiment, the tool 100 has a center of gravity longitudinally aligned with the generally convex dorsal second side 154 of the spoon 162 to thereby allow the tool 100 to balance upon the generally convex dorsal second side 154 of the spoon 162 of the eating utensil 150 in the folded arrangement of FIG. 2. For a user to determine geographical direction, the multi-function tool 100 in the folded arrangement is placed onto a flat surface and allowed to rotate around a point of contact 168 of the convex dorsal second side 154 of the spoon 162. The tool will then rotate, possibly changing rotational directions, until it settles in an orientation indicating direction such as magnetic pole north. In at least one embodiment, the compass magnet 320 and multi-function tool 100 overall are configured to direct the rearward or proximal first end 206 of the handle in the magnetic pole north direction. In the illustrated embodiment, the proximal first bridge 212 at the proximal first end 206 of the handle 200 has a longitudinally pointed tip 224 to indicate north, and to further serve as a pointed tool for digging, puncturing, and even defensive purposes.

The multi-function stabilizing element 300 may balance upon the generally convex dorsal second side 154 of the spoon 162 of the eating utensil 150 in the unfolded arrangement of FIG. 2 when the bulge 318 of the tongue 316 snaps into the notch 186 in the channel 178 of the lever 170 of the eating utensil 150. In other embodiments, the center of gravity of the multi-function stabilizing element 300 is adjustable by sliding longitudinal movement of the stabilizing element 300 permitting a user to adjust the balance of the multi-function tool 100 if needed, for example to balance upon the convex dorsal side 154 of the spoon 162. In such embodiments, the user incorporates movement of the stabilizing element 300 along the handle 200 until balance is achieved, in the geographical direction determination already described. As such, the stabilizing element 300 both locks the multi-function tool 100 in the unfolded configuration (FIG. 3) by extension of the tongue 316 into the channel 178 and stabilizes the balance of the tool 100 upon the dorsal second side 154 of the eating utensil 150 in the unfolded configuration (FIG. 2).

The multi-function tool 100 in at least one embodiment also includes a sundial 350, which may be mounted upon the palmar first side 304 (FIG. 4) of the sliding block 310 of the stabilizing element 300 as expressly shown in the illustrated example, or may be mounted elsewhere. The sundial 350 includes a face 352 having time indicator markings and a gnoman 354 extending outward from the face. The gnoman 354 in the illustrated embodiment pivots about its mounted end from a collapsed position (FIGS. 1-2) flush with sundial face 352, for storage and carrying, to a raised position (FIGS. 3-4) for time determination.

To use the multi-function tool 100 as a direction finder and time determining device, the user can fold the tool 100 into the folded configuration as illustrated in FIGS. 1-2. The user can determine geographical direction as already described. The gnoman 354 can be rotated to an angle that is appropriate for the latitude of the location where the determinations are made, and time is then determined by use of the time indicator markings on the sundial face 352.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A multi-function tool comprising:
    a utensil having a generally arcuate convex side;
    a handle pivotally attached to the utensil; and
    a compass magnet mounted on the handle or utensil, wherein the multi-function tool has a center of gravity, in at least one pivotal configuration of the utensil and handle, aligned with the generally arcuate convex side of the utensil to balance the multi-function tool upon the generally arcuate convex side of the utensil.

2. A multi-function tool according to claim 1, wherein the compass magnet is configured to rotate at least one portion of the utensil or handle to magnetic pole north upon balance of the multi-function tool upon the generally arcuate convex side of the utensil.

3. A multi-function tool according to claim 1, further comprising a hinge pivotally attaching the handle to the utensil, wherein:
    the multi-function tool has an unfolded configuration in which the utensil and handle extend in generally opposite directions from the hinge; and
    the multi-function tool has a folded configuration in which the utensil and handle extend in generally the same direction from the hinge.

4. A multi-function tool according to claim 3, further comprising a stabilizing element attached to the handle at an adjustable position, wherein the center of gravity of the multi-function tool is adjustable by adjustment of the adjustable position of the stabilizing element.

5. A multi-function tool according to claim 4, wherein the stabilizing element comprises a tongue and the utensil defines a channel that receives the tongue to lock the multi-function tool in the unfolded configuration.

6. A multi-function tool according to claim 5, wherein the tongue comprises a bulge the snaps into a notch defined in the channel to lock the tongue in the channel.

7. A multi-function tool according to claim 6, wherein the handle comprises a pair of parallel rails and the stabilizing element defines a pair of channels that receive the rails.

8. A multi-function tool according to claim 7, wherein the handle comprises at least one bridge that connects the rails.

9. A multi-function tool according to claim 4, further comprising a sundial mounted on the stabilizing element.

10. A multi-function tool according to claim 9, wherein the sundial comprises a gnoman pivotable into a flush position with a face of the sundial.

11. A multi-function tool according to claim 3, wherein the utensil comprises:
    a base;
    at least one post extending from the base and received in a hole defined by the handle such that the at least one post and hole pivotally attach the handle to the utensil and define the hinge;
    a spoon portion extending from the base in a first longitudinal direction and defining the generally arcuate convex side of the utensil; and
    a lever extending from the base in a second longitudinal direction generally opposite the first longitudinal direction, the lever engaging the handle in the unfolded configuration.

12. A multi-function tool according to claim 11, wherein the utensil comprises a bar attached to the lever, the bar having at least one dimension two great to pass between two rails of the handle to register the lock multi-function tool in the unfolded configuration with respect to at least one direction of pivoting of the utensil and handle.

13. A multi-function tool according to claim 3, further comprising a sundial mounted on the utensil or handle.

14. A multi-function tool according to claim 13, wherein the sundial comprises a gnomon pivotable into a flush position with a face of the sundial.

15. A method of using a multi-function tool at least to determine geographical direction, the method comprising:
    configuring a multi-function tool having an eating utensil and a handle pivotally attached to the eating utensil by a hinge into a folded configuration in which the handle and eating utensil extend in generally the same direction from the hinge, the multi-function tool having a compass magnet mounted on the handle or eating utensil;
    balancing the multi-function tool upon a generally arcuate convex side of the eating utensil thereby permitting the compass magnet to cause a rotational orientation of the multi-function tool; and
    determining a geographical direction from the rotational orientation of the multi-function tool.

16. The method of claim 15, further comprising configuring the multi-function tool into an unfolded configuration in which the eating utensil and handle extend in generally opposite directions from the hinge.

17. The method of claim 16, further comprising using the eating utensil to carry food.

18. The method of claim 15, wherein balancing the multi-function tool comprises adjusting a center of gravity of the multi-function tool over the generally arcuate convex side of the eating utensil by adjusting a position of a stabilizing element attached to the handle.

19. The method of claim 18, further comprising:
    configuring the multi-function tool into an unfolded configuration in which the eating utensil and handle extend in generally opposite directions from the hinge; and
    locking the multi-function tool into the unfolded configuration by moving the position of the stabilizing element.

20. The method of claim 15, further comprising further comprising determining a time using a sundial mounted on the multi-function tool.

* * * * *